Nov. 10, 1953 A. TAUB 2,658,488
INTERNAL-COMBUSTION ENGINE
Filed Aug. 7, 1950 3 Sheets-Sheet 2
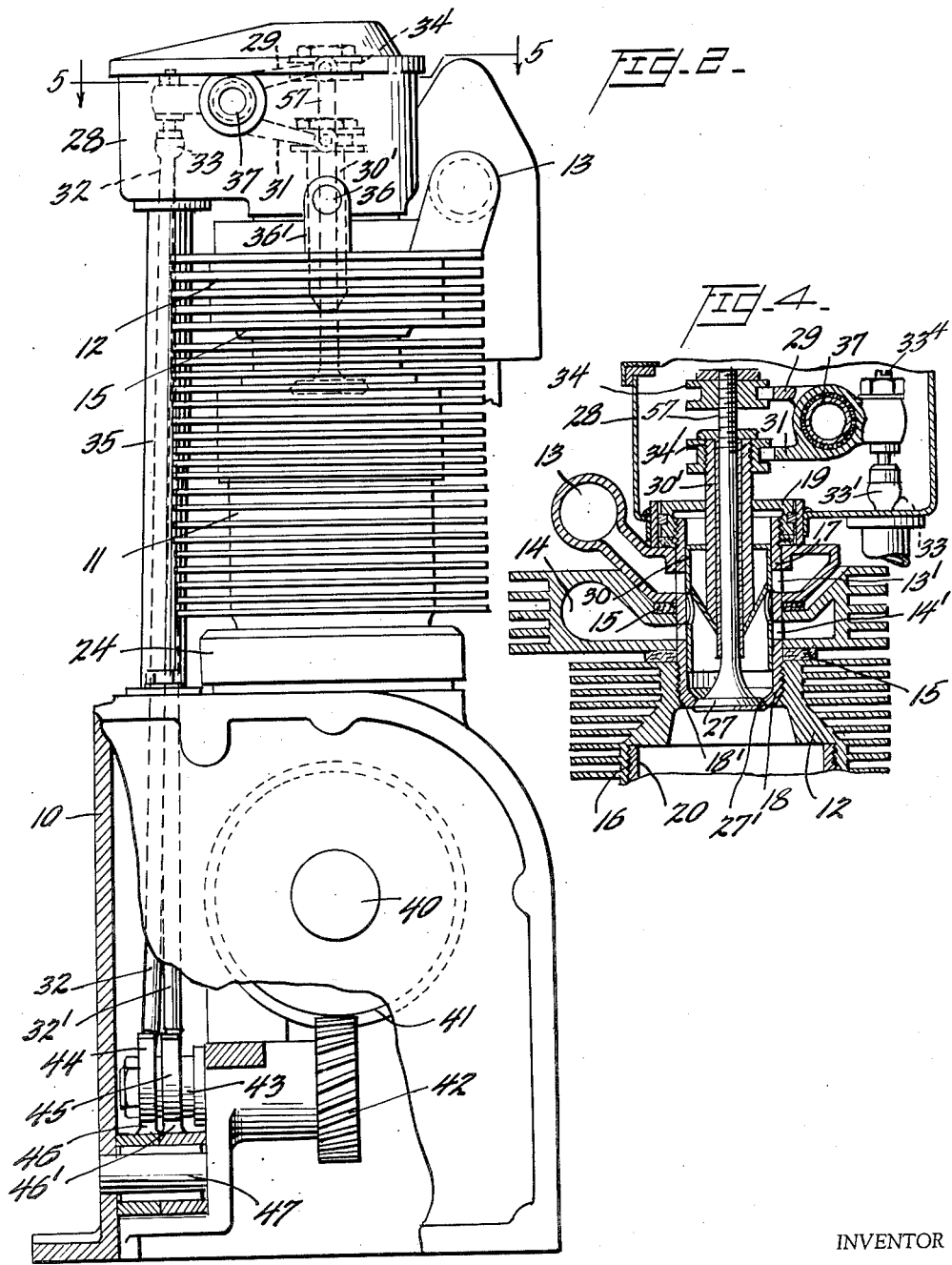
INVENTOR
Alex Taub,
BY
ATTORNEY

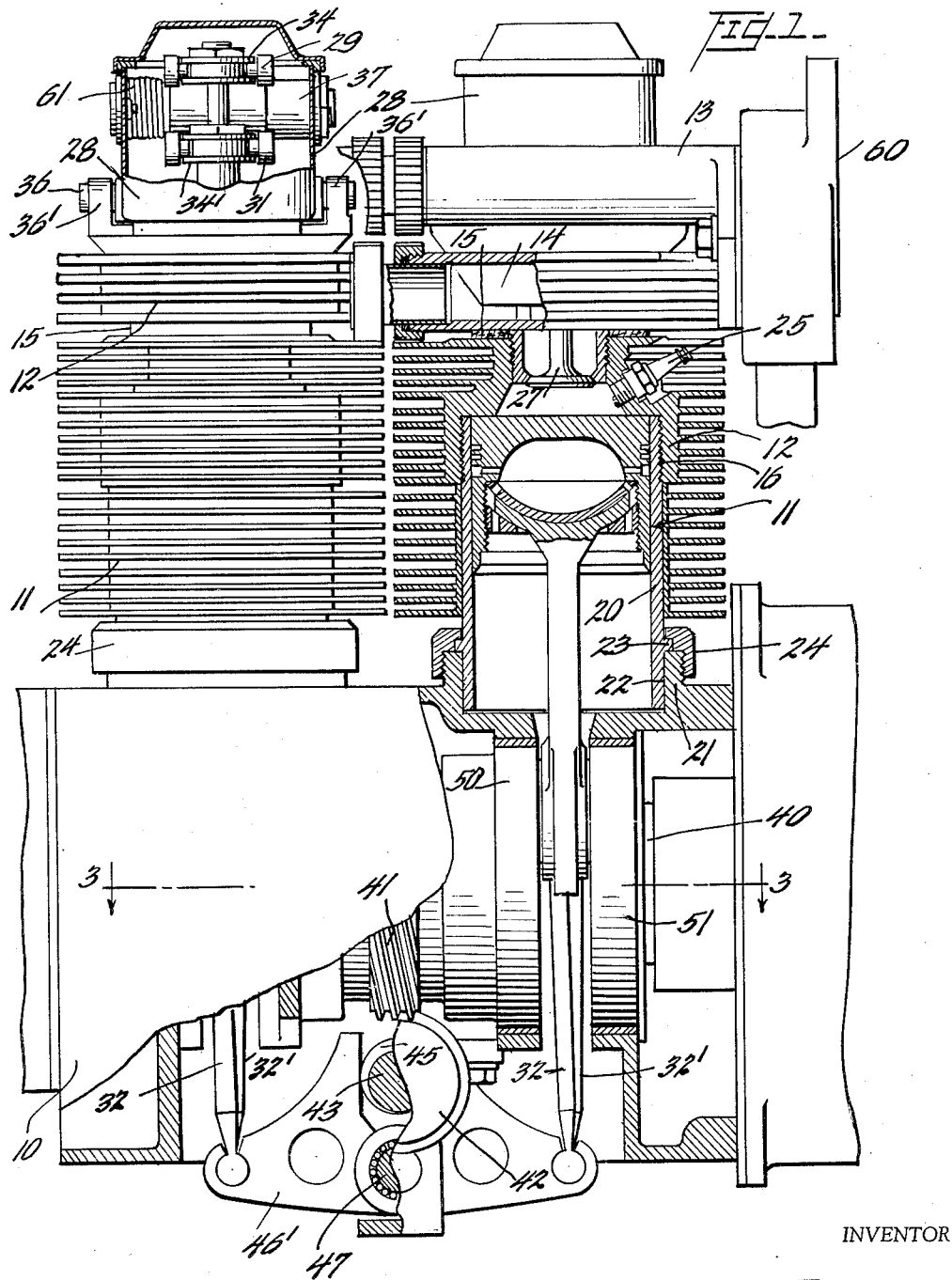

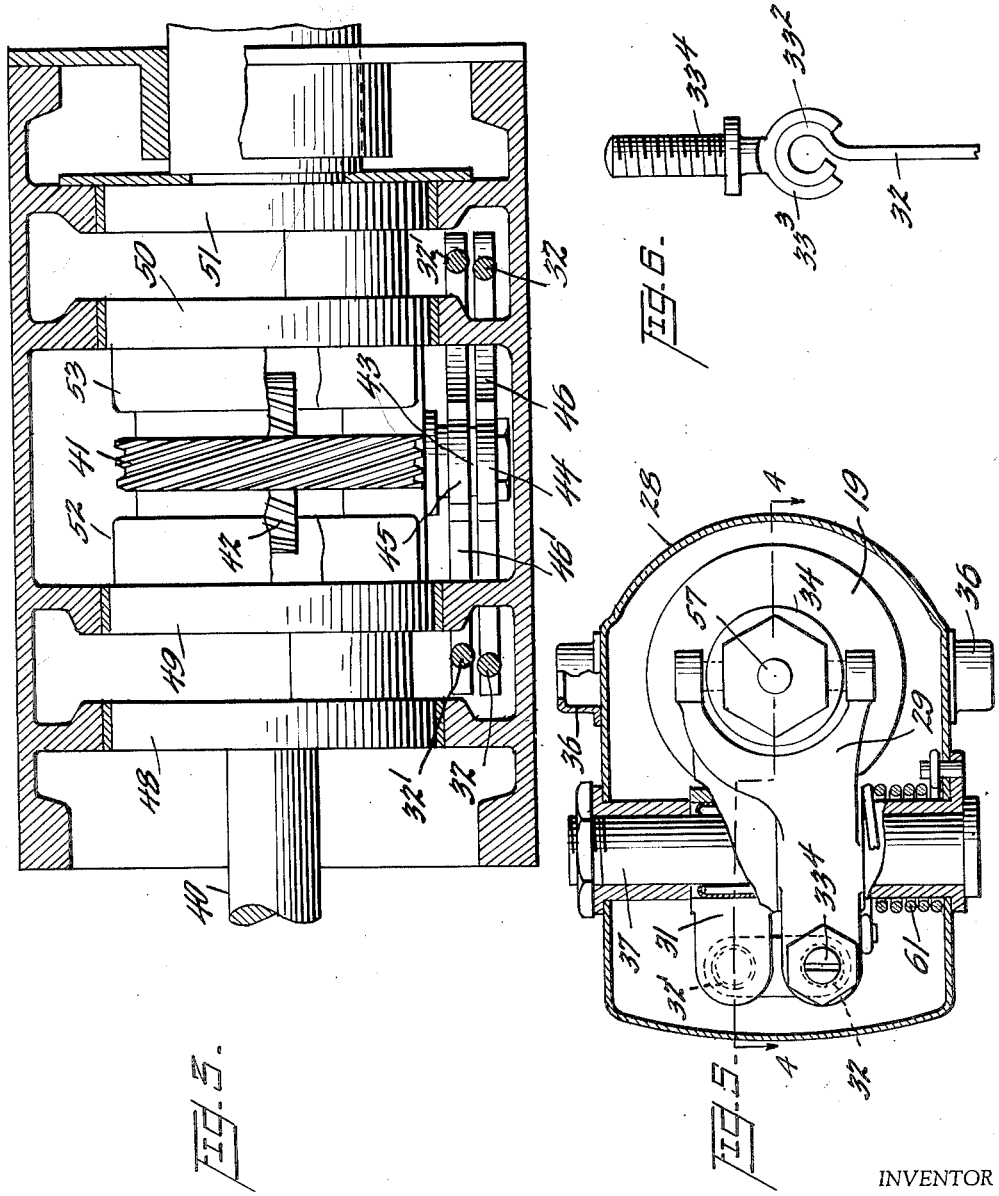

UNITED STATES PATENT OFFICE 2,658,488

INTERNAL-COMBUSTION ENGINE

Alex Taub, Washington, D. C., assignor to Taub Engineering Company, Washington, D. C., a corporation of Delaware Application August 7, 1950, Serial No. 178,129

7 Claims. (Cl. 123—41.69)

The present invention pertains to improvements in the construction of internal combustion engines and is particularly directed to an elimination of present existing adverse operating conditions. More particularly, the construction of my engine is such as to eliminate distortion caused by mechanical and thermal effects. The present invention also provides a combination of elements which greatly simplifies the engine mechanism and makes possible an extremely compact power plant. The nature of my invention and its advantages will be brought out in the following detailed description taken in connection with the accompanying drawings in which:

Figure 1 is a side elevation, partly in section, of an engine according to my invention;

Figure 2 is an end elevation thereof, partly in section;

Figure 3 is a horizontal cross section along line 3—3 of Figure 1 through the crankshaft;

Figure 4 is a detail sectional view along line 4—4 of Figure 5 of the valve arrangement;

Figure 5 is a detail view of the rocker mounting, on the lines 5—5 of Figure 2; and Figure 6 is a view of a modified form of a detail.

By way of illustration, the invention is described with reference to its embodiment in a two cylinder engine. Referring to the drawings, the engine comprises the crankcase 10, and the two cylinders which are designated in their entirety as 11, 11. Each cylinder is provided with a separate cylinder head 12 which is characterized by the complete absence of the usual ports therein. As a result, structurally weak areas and relatively hot and cold areas are completely eliminated in this critical component of the engine structure and even expansion and contraction thereof is made possible. Intake ports are provided in a separate intake casing 13, and exhaust ports are arranged in a separate exhaust casing 14. The parts 12, 13 and 14 are insulated from each other by means of layers of a thermal insulator 15, 15. The latter additionally reduces the backflow of heat to the combustion chamber of the cylinders from the waste i. e. exhaust heat areas, thereby improving the operating conditions of the engine from the standpoint of anti-detonation. At one end, the intake casing 13 is provided with a flange 60 for association with the carburetor.

Each cylinder head 12 is threaded on the respective cylinder barrel 20 as at 16, this manner of connecting the parts eliminating the use of bolts and gaskets. Similarly, a valve sleeve 17 provided with ports 13', 14' is threaded into the central part of the cylinder head as at 18; the said ports 13', 14' lead to the intake and exhaust headers respectively. The end of the sleeve 17 is provided with a tapered surface 18' which seats tightly against a correspondingly shaped tapered surface in the cylinder head. A threaded cap membr 19 serves to clamp tightly together the cylinder head 12, the exhaust header 14 and the intake header 13. As illustrated in the drawings, the cylinder 11, head 12 and exhaust header 14 are all provided with cooling fins.

At its lower end, each cylinder barrel 20 has a pilot fit into the interior of a projecting flange 21 on the crankcase 10 as at 22. As will be observed, the barrel is provided with an external, annular flange member 23 which rests with its lower surface on top of the flange 21. A large, threaded clamp ring 24 serves to fasten the cylinder barrel 20 to the flange 21 on the crankcase. This manner of clamping the parts together makes it possible to orient the position of the cylinder barrel 20—after the cylinder head 12 has been attached thereto—so as to provide for the maximum accessibility of the spark plug 25 without the use of a special index of threaded portions. Moreover, these clamping means enable the proper tightening of the parts without creating mechanical distortion of the cylinder barrel, as is frequently the case where bolts are used to fasten the barrel in position and the bolts are over-tightened or unevenly tightened. The elimination of cylinder barrel distortion is of great practical importance since experience has shown that blow-by of hot gases is promoted when cylinder barrels are so distorted.

A further and important part of my invention is directed towards the elimination of the present difficulties of valve setting and the extreme variation in valve timing caused by improper setting thereof. To this end, my invention provides a valve 27 positioned in the central part of the cylinder head 12 and which is actuated by a rocker mechanism supported on the cover 28 for the rocker mechanism. While the engine shown on the drawings is of the single central valve type, it is to be understood that this is merely by way of illustration, and that my invention is adapted for use with engines where both the intake and exhaust valves are of the poppet type. As shown in Figure 4, the valve 27 which controls a port in the center of the head 12 and is provided with a tapering seat 27' on the sleeve 17, is operated by the rocker arm 29, while the oscillating sleeve 30 is operated by the rocker arm 31. Both rocker arms 29, 31 are mounted for oscillation about the pivot 37, fastened by its ends in the cover 28. These rocker arms are operated by the respective push rods 32, 32', whose upper ends 33, 33' are associated in a conventional manner, as by a ball joint, with the member 33⁴ fastened to the outboard ends of the respective rocker arms.

Alternatively, instead of connecting the upper end of the push rod to the rocker arm by a ball joint, the end of the push rod 32 (Figure 6) may be provided with a non-detachable cylindrical head $33^2$, which is received in a corresponding cylindrical support $33^3$ arranged on the member $33^4$ associated with the rocker arm. This construction is quite satisfactory when the push rods are made of springy, steel material.

Adjustment of the position of the rocker arms is obtained by a corresponding adjustment of the rocker spools 34, 34' (Figure 4) which are respectively threaded on the stem 57 of the valve 27 and on the tubular stem 30' associated with the oscillating sleeve 30. The rocker spools are fixed in their adjusted position by means of suitable locking devices which, in the interest of simplicity, are not shown in the drawings. The aforementioned rocker mechanism cover 28 is attached at its one end by means of its combined drain and push rod pipe 35 and to the crankcase 10 (Figure 2); at the other end, the cover has a pivotal mounting on the top of the engine as by pivots 36 carried in lugs 36' provided on top of the head 12. By reason of this particular mounting of the cover 28 on which the rocker mechanism is supported, it is possible to maintain the valve settings by the thermal compensation of components that have varying rates of expansion.

While the valve 27 has been described as being positively opened and closed there may, under some circumstances, be provided a spring 61 (Figure 5) to operate the closing of the valve. This will be particularly desirable when the engine operates in very cold climates, where the temperature difference between the valve and the valve rod is particularly large, causing appreciable differences in the thermal expansions of these elements.

Mounted in suitable bearings in the crankcase 10, is the crankshaft 40 (Figure 3), provided at its center with a spiral gear 41, which drives a cooperating gear 42 on the cam shaft 43, which extends at right angles to the crankshaft 40. The camshaft is provided with suitably shaped cams 44, 45 (Figure 2) for actuating the rocking, Scotch yokes 46, 46' adapted to swivel about the pivot 47, mounted on the wall of the crankcase. The outer ends of the yokes are constructed to receive the cylindrical heads provided at the lower ends of the push rods 32, 32' (similar to those shown in Figure 6) and, as shown in Figure 1, the adjacent ends of the two yokes are connected to the two push rods 32, 32' of the same cylinder. This is feasible when the two adjacent cylinders are timed 360° apart. The described cam drive and associated mechanism for operating the push rods makes for simplicity of production and service and permits the engine to be "thin" in the crankcase region. This is of particular importance where an engine is to be built up of a plurality of two-cylinder units of the type shown in the drawings. The compactness of the design is additionally enhanced by using the crankshaft cheeks 48, 49, 50, 51 as the main bearings, and by forming the center cheek as the cam shaft drive gear 41. Counterweights 52, 53 are mounted on the crankshaft.

I claim:

1. In an engine in combination, a cylinder barrel, a head therefor, separate intake and exhaust casings fastened to said cylinder head, a valve mounted in said cylinder head, rocker mechanism for actuating said valve, a cover for said rocker mechanism pivotally mounted on said intake casing, said rocker mechanism being pivotally mounted on said cover.

2. In an internal combustion engine, the combination comprising: a cylinder barrel having an exterior circumferential flange adjacent to the inner end thereof; a crankcase having an opening receiving the inner end of said barrel; an exterior annular boss surrounding said opening, the outer face of said boss forming a seat for said barrel flange; exterior threads on said boss; a clamping nut engaged with said thread and said barrel flange to retain said barrel on said crankcase; a finned sleeve on said barrel; and a cylinder head threaded onto the outer end of said barrel.

3. In an internal combustion engine, the combination comprising: a cylinder barrel; a cylinder head threaded on the outer end of said barrel and having an interiorly threaded opening coaxial with said barrel; a ported sleeve threaded into said opening; a hollow annular exhaust casing and a hollow annular intake casing stacked on said sleeve, said casings having inner ports registering with said sleeve ports; and a clamping nut threaded onto the outer end of said sleeve for retaining said casing thereon.

4. The structure defined in claim 3, in which the inner end of the sleeve forms a valve seat, and including a valve reciprocable on said seat to control communication between the barrel and the interior of said sleeve.

5. The structure defined in claim 3, in which the inner end of the sleeve forms a valve seat, and including a valve reciprocable on said seat to control communication between the barrel and the interior of said sleeve, and a ported sleeve valve reciprocable in said sleeve to control communication between the interior thereof and said casings.

6. The structure defined in claim 3, including thermal insulation between the cylinder head and the exhaust casing and between said exhaust casing and the inlet casing.

7. In an internal combustion engine, the combination comprising: a cylinder barrel; a head thereon; a valve reciprocable in said head; a rocker mechanism cover pivotally mounted on said head; and rocker mechanism for actuating said valve pivotally mounted on said cover about an axis parallel to said cover pivotal mounting.

ALEX TAUB.

References Cited in the file of this patent

UNITED STATES PATENTS

| Number | Name | Date |
|---|---|---|
| 1,029,460 | Redrup | June 11, 1912 |
| 1,057,063 | Knudsen | Mar. 25, 1913 |
| 1,101,590 | Upton | June 30, 1914 |
| 1,126,224 | Jones | Jan. 26, 1915 |
| 1,299,555 | Cosgray | Apr. 8, 1919 |
| 1,329,811 | Smith | Feb. 3, 1920 |
| 1,332,294 | Holmes | Mar. 2, 1920 |
| 1,352,897 | Holmes | Sept. 14, 1920 |
| 1,374,158 | Inshaw | Apr. 5, 1921 |
| 1,655,149 | Lee | Jan. 3, 1928 |
| 1,993,875 | Daub | Mar. 12, 1935 |
| 2,058,055 | Boock | Oct. 20, 1936 |
| 2,137,391 | Chilton | Nov. 22, 1938 |
| 2,311,329 | Caminez | Feb. 16, 1943 |
| 2,374,380 | Rodgers | Apr. 24, 1945 |
| 2,439,073 | Butterfield | Apr. 6, 1948 |
| 2,492,582 | Klotsch et al. | Dec. 27, 1949 |

FOREIGN PATENTS

| Number | Country | Date |
|---|---|---|
| 603,778 | France | Dec. 20, 1924 |